United States Patent
Neufeldt

(10) Patent No.: US 10,240,716 B2
(45) Date of Patent: Mar. 26, 2019

(54) ERGONOMIC RIG FOR A VIRTUAL CAMERA DEVICE

(71) Applicant: Dan Neufeldt, Torrance, CA (US)

(72) Inventor: Dan Neufeldt, Torrance, CA (US)

( * ) Notice: Subject to any disclaimer, the term of this patent is extended or adjusted under 35 U.S.C. 154(b) by 76 days.

(21) Appl. No.: 15/299,197

(22) Filed: Oct. 20, 2016

(65) Prior Publication Data

US 2018/0191959 A1    Jul. 5, 2018

(51) Int. Cl.
| | | |
|---|---|---|
| *F16M 13/02* | (2006.01) |
| *H04N 5/232* | (2006.01) |
| *G03B 17/56* | (2006.01) |
| *G06T 7/80* | (2017.01) |
| *H04N 5/225* | (2006.01) |
| *F16M 11/10* | (2006.01) |

(52) U.S. Cl.
CPC ......... *F16M 13/027* (2013.01); *G03B 17/561* (2013.01); *G03B 17/563* (2013.01); *G06T 7/80* (2017.01); *H04N 5/23203* (2013.01); *F16M 11/10* (2013.01); *H04N 5/2251* (2013.01)

(58) Field of Classification Search
CPC ............. H04N 5/23267; H04N 5/2251; H04N 5/23258; H04N 5/23293; F16M 13/027; F16M 11/10; G03B 17/563; G03B 17/561
USPC ................................................. 348/373–375
See application file for complete search history.

(56) References Cited

U.S. PATENT DOCUMENTS

| | | | | | |
|---|---|---|---|---|---|
| 6,056,449 | A | * | 5/2000 | Hart ........................ | F16M 13/04 396/421 |
| 8,474,169 | B2 | * | 7/2013 | Cottle ..................... | F41C 23/04 42/73 |
| 8,567,952 | B2 | * | 10/2013 | Taylor ................... | B66F 11/048 352/243 |
| 9,557,006 | B2 | * | 1/2017 | Fee ........................ | F16M 13/04 |

* cited by examiner

*Primary Examiner* — Lin Ye
*Assistant Examiner* — Chan T Nguyen
(74) *Attorney, Agent, or Firm* — Omni Legal Group; Omid E. Khalifeh

(57) ABSTRACT

An ergonomic rig for operating a virtual camera device comprises, in one embodiment, a first leg rigidly coupled to a center mount configured to support a virtual camera display. Additionally, a second leg is spaced apart from the first leg and rotatably coupled to the center mount, and one or more means for executing motion tracking, such as motion capture display rods and markers, are disposed on a top end of the second leg. Finally, an ergonomically-shaped handle is rotatably secured to the second leg below a joint defined by the rotatable coupling of the second leg and center mount. Thus, two linearly displaced rotational joints may be provided in order to increase rotation achievable by any virtual camera calibration devices secured to the rig while avoiding excessive flexion and extension in a user's wrist, fingers, and/or shoulder.

20 Claims, 3 Drawing Sheets

ERGONOMIC RIG FOR A VIRTUAL CAMERA DEVICE

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to rigs for supporting and manipulating video recording devices and, more particularly, to an apparatus for ergonomically adjusting elements of a virtual camera device.

BACKGROUND

The following is a tabulation of some prior art that presently appears relevant:

U.S. Patents

| Pat. No. | Kind Code | Issue Date | Patentee |
| --- | --- | --- | --- |
| 4,017,168 | A | Apr. 12, 1977 | Brown |
| 5,585,849 | A | Dec. 17, 1996 | Robalino |
| 7,703,995 | B1 | Apr. 27, 2010 | Sivan |
| 8,567,952 | B2 | Oct. 29, 2013 | Taylor |
| 8,894,456 | B2 | Nov. 25, 2014 | Bicknell |

U.S. Patent Application Publications

| Publication Number | Kind Code | Publ. Date | Applicant |
| --- | --- | --- | --- |
| Not found | | | |
| Not found | | | |
| Not found | | | |

Foreign Patent Document

Nonpatent Literature Documents

BACKGROUND

There are some virtual camera devices ("VCD"s) available in the marketplace in which the movement of the device is digitally tracked by motion tracking systems and used to drive movement of either software based cameras that digitally render video imagery in real time or physical cameras moved by computer driven motion control systems. Video feed generated by the camera controlled by the VCD may be communicated to and shown on a display in wired or wireless communication with the VCD. Some of these displays are mounted directly on or in combination with the VCD, while others are configured as virtual reality goggles, otherwise worn on the body of a person operating the virtual camera, or even placed in a remote location.

Devices comprising a display mounted directly on the VCD may provide operators with a filming experience similar to using any typical camcorder known in the art while also including the benefit of being able to directly incorporate visual effects ("VFX") and digitally generated imagery in the display. Unfortunately, such devices have thus far not been configured to enable operators to manipulate the camera through the full range of motion made possible by such a system.

For example, some solutions provide a rotational joint between the portion of the device whose motion is tracked, and a display so that an operator can hold a display in a steady, viewable position while rotating the tracked portion of the device, whose movement is applied to the controlled camera. More particularly, one possible arrangement may be a VCD with two handles. In such arrangements, a display is mounted to a static handle while the tracking device is rotatably mounted to the display. This enables a user to rotate the tracking portion of the device while maintaining the display in a fixed position so that it is easily viewable by the user. However, any range of rotatable adjustment achievable by such an arrangement is typically limited to the amount that an operator is able to flex and/or extend his wrist while tilting the rotatable handle associated with the tracked portion of the device.

To the extent that vertical displacement in the camera movement is acceptable, an operator may also lift and/or lower the entire VCD to achieve a greater range of rotation of the tracked handle, however flexing and/or extending the shoulder and wrist joints for the amount of time needed to stably create the desired camera movement may cause cramps and uncomfortable contractures in the hand, arm, and shoulder muscles, which can lead to inflammation, joint stiffness, deformities, and even functional disability over time. The operator may also achieve a somewhat greater range of rotation by modifying his grip position on the handle, however this will typically make it difficult to reach any controls conveniently disposed on the VCD near the operator's gripping hands.

Therefore, it is desirable that occupational tools are provided which support immobilization in therapeutic positions in order to minimize/prevent joint stiffness and intrinsic contractures. Moreover, such tools should be configured to enable a wide range of rotation of markers that are tracked by a motion capture system in an ergonomic manner while avoiding obscuring any incorporated displays. Thus, there remains a need for an ergonomic rig for manipulating, and more particularly rotating portions of, a virtual camera device.

SUMMARY

The present disclosure is directed to a supportive rig for videography, and more particularly to a rig for a virtual camera device ("VCD") having laterally displaced rotational pivot points that enable rotation of means for virtual camera tracking, such as gyroscopes, accelerometers, rotary encoders, rods and markers known in the art, in a manner that avoids injury to a VCD operator as well as obstruction of any supported virtual camera displays.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, an ergonomic rig for a virtual camera device comprises a first leg rigidly coupleable to an end of a center mount. The center mount may be configured to removably or even adjustably receive a digital virtual camera device display, which are known in the art, although it is contemplated that the virtual camera device display may be permanently integrated into the body of the center mount in some embodiments of a virtual camera device. Thus, precise orientation of the display should not limit the disclosure, however, it will be understood that the display may be stably maintained at any orientation desired by the operator to conveniently view images generated thereon. Indeed, the first leg may have disposed thereon a grip that enables an operator to stably and comfortably hold and maintain the VCD, and thus the display, in a desirable position over the course of use.

A second leg may be rotatably coupled to another end of the center mount, and one or more means for motion tracking, such as motion capture markers, tracking sensors such as cameras, or even microphones may be attached to the second leg at any position along the second leg. One or more motion tracking means or devices may protrude from the second leg according to a desirable pattern that may depend, for example, on algorithms used for optical tracking, however, one skilled in the art will recognize that such means and/or devices may be incorporated into the body of the second leg so as to be unseen, or may even be disposed flush against the second leg so as not to protrude from the leg. Thus, any particular embodiment of the means or devices for motion tracking will be rotatably adjustable in accordance with the disclosure.

Next, a handle may be rotatably secured to an outside of the second leg below the joint defined by the rotatable coupling of the second leg and center mount. The handle may be formed as a simple rod-like protrusion, however, it is contemplated that an ergonomic handle may be provided which is formed to comfortably fit into portions of an operator's hand. Thus, the handle may comprise one or more divots sized to receive an operator's fingers, for example. As another example, the handle may be curved to comfortably receive and/or support the webbed space between an operator's thumb and forefinger. In any event, one skilled in the art will recognize that many forms of a rotatable handle are possible and not limited to the examples described.

Where an operator was formerly limited to rotating the tracking devices only as far as he could extend or flex his wrist while holding an analogous second leg, the rotating handle may increase the range of degrees that the tracking devices are optionally rotatable. Though the operator's wrist would otherwise define a joint capable of only limited rotation, providing a rotatable handle enables the operator to maintain his wrist in a neutral position while applying rotational forces to the joint defined by the coupling of the handle to the second leg.

The rotatable coupling of each of the second leg to the center mount and the handle to the second leg may be achieved by any means capable of permitting uniaxial rotation, such as, for example and without limitation, by coupling the second leg and center mount and handle and second leg, respectively, to one another with a pin joint. In some embodiments, it may be desirable to maintain a particular degree of rotation for a prolonged period of time, thus, it is contemplated that the rotational joints may also be lockable in some embodiments.

In this manner, two linearly displaced rotational joints may be placed along one leg of a VCD in order to increase the degree of rotation achievable by any motion capture markers or other motion tracking devices secured to the leg. At the same time, excessive flexion and extension in a user's wrist, fingers and/or shoulder joints may be avoided.

Other elements are contemplated. For example, a control panel for operating the VCD may be disposed or incorporated on or near any of the first leg, second leg, display, or center mount. Additionally, a power source may be disposed or incorporated on or near any of the first leg, second leg, display, or center mount.

The elements comprising the ergonomic rig for a virtual camera device may be provided in some embodiments as a kit.

One or more of the above-disclosed embodiments, in addition to certain alternatives, are provided in further detail below with reference to the attached figures. The disclosed subject matter is not, however, limited to any particular embodiment disclosed.

Figure 1:
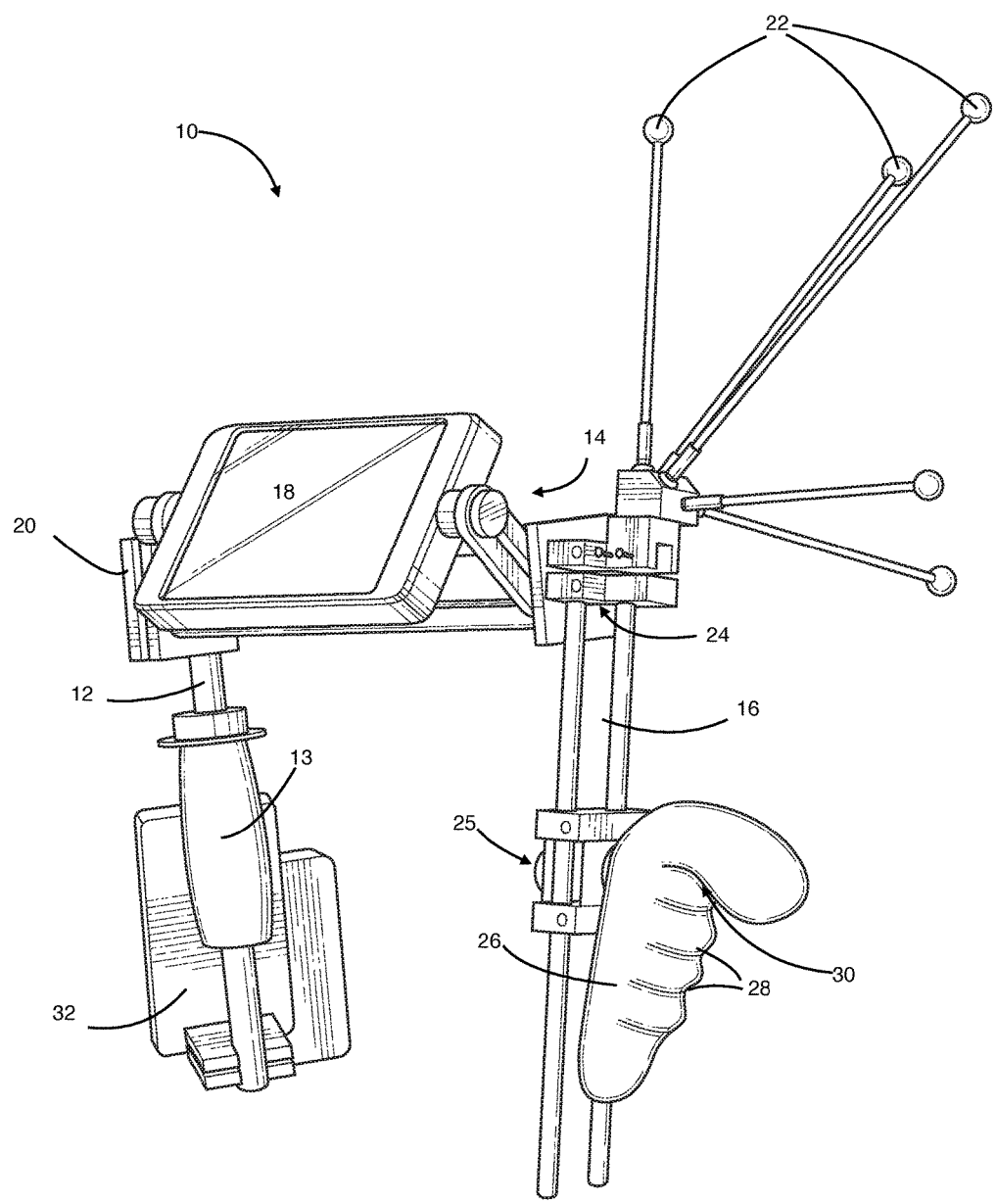
FIG. 1 shows a perspective view of an embodiment of the virtual camera device rig according to one embodiment.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

Figure 2:
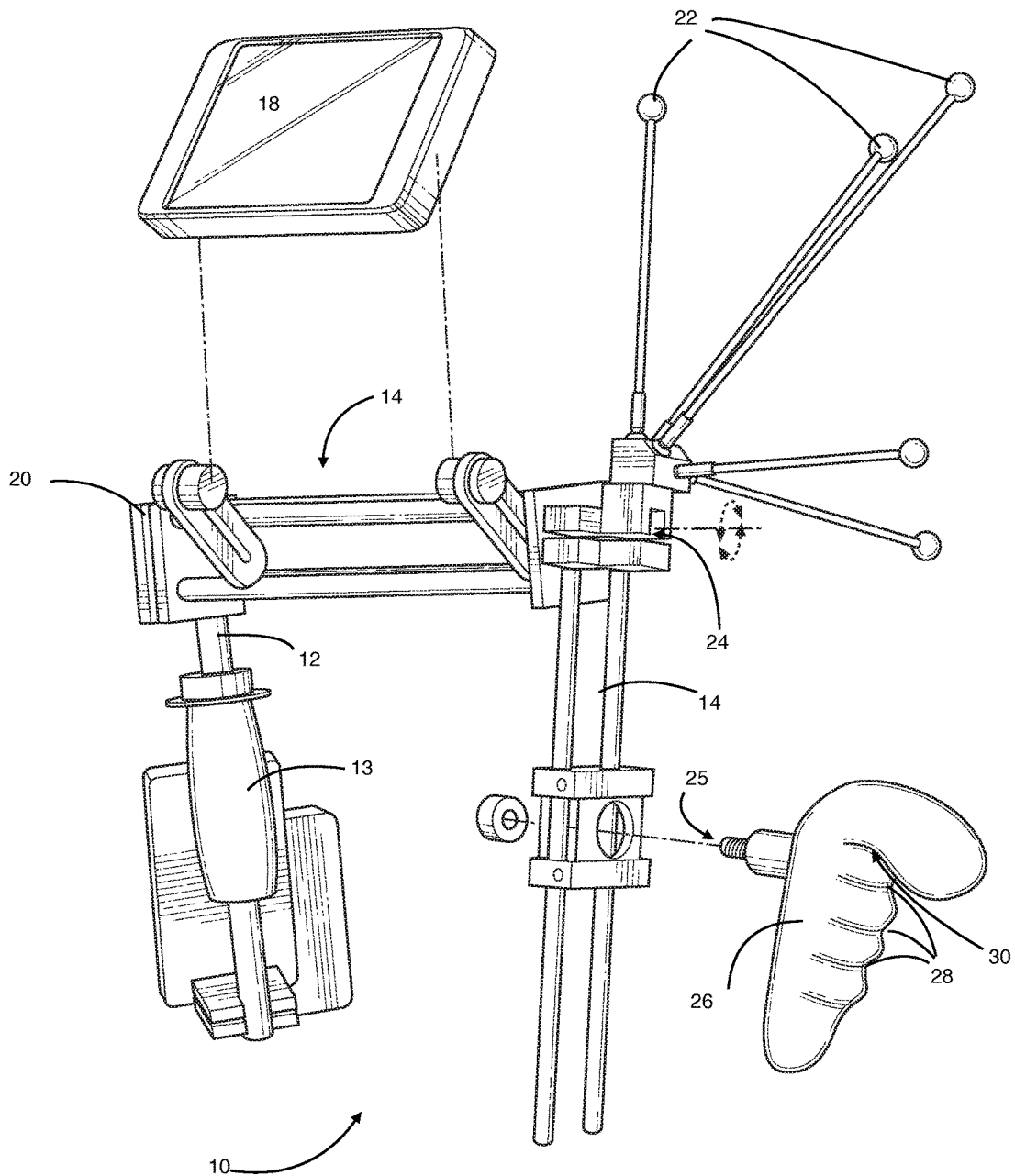
FIG. 2 shows an exploded view of an embodiment of the virtual camera device rig according to one embodiment.

With reference to FIGS. 1 and 2, an ergonomic rig 10 for a virtual camera device ("VCD") comprises a first leg 12 rigidly coupleable to an end of a center mount 14, and a second leg 16 rotatably coupleable to the center mount 14 in a position spaced apart from the first leg 12. The center mount 14 may be configured to receive and support a digital VCD display 18 electronically configured to show a VCD operator digitally rendered images created with the VCD. Many different kinds of displays are are known in the art. For example, in some embodiments, the display 18 may comprise an LCD touchscreen that presents the operator with selectable controls. Though the display 18 appears to be suspended in and tilted with respect to the center mount 14 in the figures, it is contemplated that in some embodiments, the VCD display may be permanently integrated into the body of the center mount 14 in some embodiments of a virtual camera device. Thus, the precise orientation of the pictured display 18 should not limit the disclosure. Instead, it should be understood that the display 18 may be stably maintained at any orientation desired by the operator to conveniently view images generated thereon. Indeed, the first leg 12 may have disposed thereon a grip 13 that enables an operator to comfortably and stably hold and maintain the VCD, and thus the display 18, in a desirable position over the course of use. Indeed, to further aid stable and comfortable holding, it is contemplated that the joint 20 defined by the rigid coupling of the first leg 12 to the center mount 14 may be lockably adjustable.

One or more means for tracking the physical motion of the VCD, such as motion capture display rods and markers 22, may, in some exemplary embodiments, be disposed on a top end of the second leg 16 above a joint 24 defined by the rotatable coupling of the second leg 16 and center mount 14. This ensures that the second leg 16 may be rotated in a plane orthogonal to the center mount 14, and further enables a VCD operator to rotatably adjust or tilt the position of any virtual camera tracking devices 22 disposed thereon.

The one or more virtual camera tracking means or devices 22 may protrude from the second leg 16, as shown in the figures, according to a desirable pattern that may depend, for example, on algorithms defining an intended digital picture. However, one skilled in the art will recognize that such means and/or devices may be incorporated into the body of the second leg 16 so as to be unseen, or may even be disposed flush against the second leg so as not to protrude from the second leg 16 at all. Thus, any possible embodiment of the means or devices for virtual camera calibration will be rotatably adjustable in accordance with the disclosure.

Figure 3:
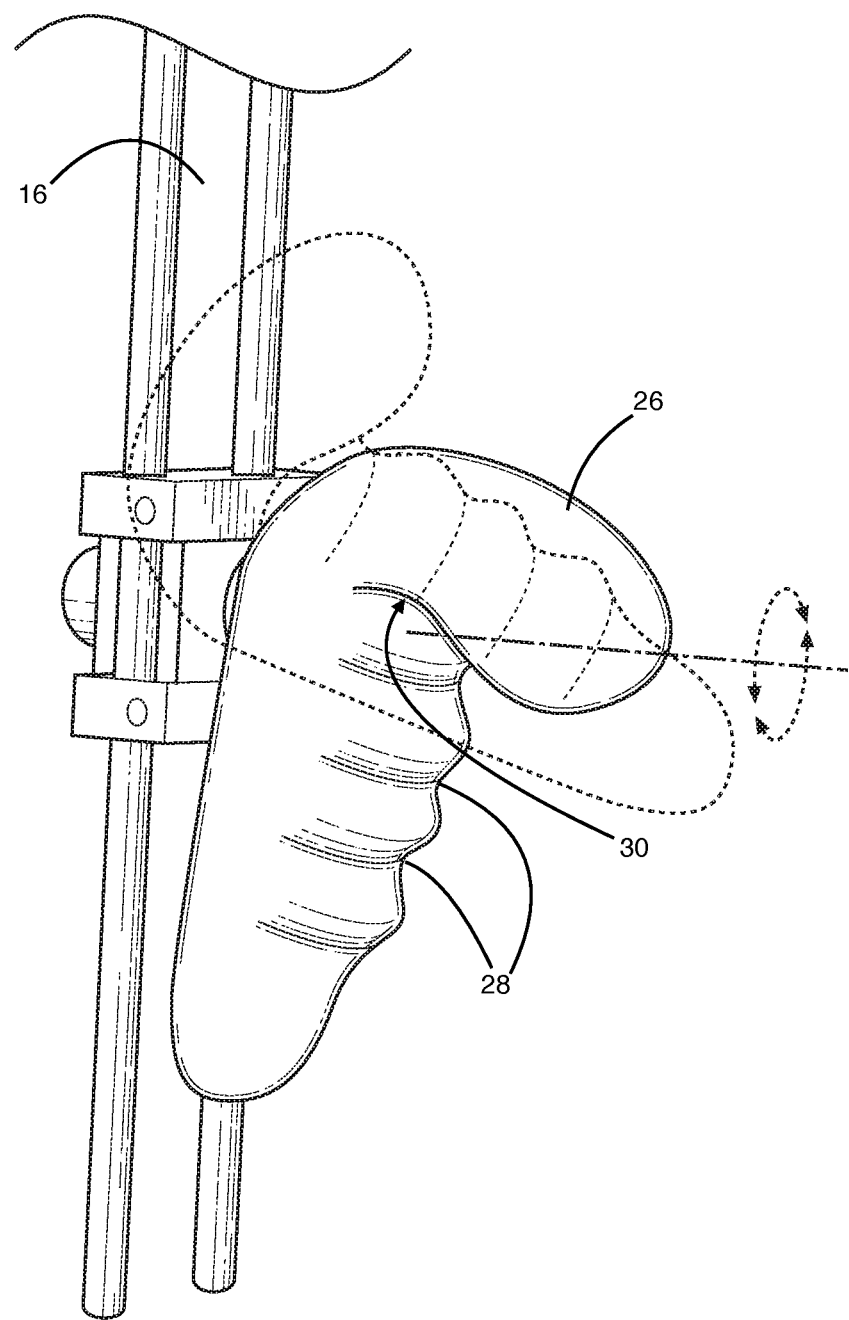
FIG. 3 shows a close-up view of a portion of the virtual camera device rig according to one embodiment.

Next, to overcome usual limitations in the rotation of the second leg 16 with respect to the center mount 14, which have been known to occur when operating a VCD by hand, a handle 26 may be further rotatably secured along a portion of the second leg 16 below the joint 24 defined by the rotatable coupling of the second leg 16 and center mount 14. The handle 26, which is shown more closely in FIG. 3, may take any number of hand-holdable forms. For example, in one embodiment, the handle 26 may be formed as a rod-like protrusion, however, it is contemplated that an ergonomic handle may be provided which is formed to comfortably fit into portions of an operator's hand. In one embodiment, then, the handle 26 may comprise one or more divots 28 sized to receive an operator's fingers, for example. As another example, the handle may comprise a curved portion 30 configured to comfortably receive and/or support the webbed space between an operator's thumb and forefinger. In some embodiments, the handle 26 may comprise material such as rubber, silicon, and flexible or nitrile polyvinyl chloride, and plasticized foam, among others, which may be chosen to further enhance comfort of the operator. The size of the handle 26 may of course vary depending on the particular size, including length and girth, desired by an operator. In any event, one skilled in the art will recognize that many forms of a rotatable handle are possible and not limited to the examples pictured or described.

Returning to FIGS. 1 and 2, by providing a rotatable handle in conjunction with the joint 24 joining the second leg 16 and center mount 14, rotation of the second leg 16 is not limited by rotation achievable by the operator's wrist. Instead, providing a second rotational pivot point 25 ensures that an operator may maintain his wrist and fingers in a neutral position, avoiding unsafe and uncomfortable flexion and extension of his own joints and muscles, over the course of use. In this manner, it is contemplated that the particular positioning of the means or devices provided for tracking a virtual camera 22 may be altered and/or adjusted according to a videographer's needs. It should be noted, though, that in some embodiments, motion capture markers and rods 22 may be replaced or extend in conjunction with other devices, such as, for example and without limitation, one or more physical cameras, lighting devices, light sensors, microphones, and others.

The rotatable coupling of each of the second leg 16 to the center mount 14 and the handle 26 to the second leg 16 may be achieved by any means capable of permitting uniaxial rotation in a plane perpendicular to the center mount 14. For example and without limitation, the second leg 16 and center mount 14 and handle 26 and second leg 16, may be respectively coupled to one another with a pin joint. In some embodiments, means for rotatably coupling such elements may comprise a pivot, swivel, or rotary joint or union, among others. In some embodiments, it may be desirable to maintain a particular degree of rotation for a prolonged period of time, thus, it is contemplated that the rotational joints may also be lockable once a desirable degree of tilt is achieved.

In some embodiments, the rig 10 may further comprise a control panel for operating the VCD disposed or incorporated on or near any of the first leg, second leg, display, or center mount. Additionally, a power source may be disposed or incorporated on or near any of the first leg, second leg, display, or center mount. Any control panel 32 may be placed, for example, near the grip 13 to enable easy access to controls which define operation of the VCD in any manner known to those skilled in the art. Such means may be wired or wireless communication with the virtual camera so that selecting buttons or providing touchscreen commands may cause the VCD to record or render footage accordingly.

It is shown in the figures that the first leg 12 and center mount 14 are joined along a left side of the rig 10, however, it will be apparent to one skilled in the art that the relative positioning of the first and second legs 12, 16 may be swapped so that the first leg 12 and grip 26 is joined to the center mount 16 at a rigid joint on a right side of the ergonomic device, and the dually rotatable second leg 16, including means for calibrating the virtual camera 22, is joined to the center mount 14 on the left side of the rig 10. This may be desirable where, for example and without limitation, a user experiences better dexterity with his left hand and would prefer to rotatably manipulate the rig 10 with his left hand. Thus the device is drawn in accordance with one embodiment for the sake of brevity only.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, dimensions of each element comprising the ergonomic virtual camera rig may vary depending on the particular needs of each individual user. In an embodiment, each leg may be longer or shorter depending on the user's arm length, and the grip and handle may be defined by greater or lesser girth depending on a user's preference or even the size of his hands. Accordingly, it is intended that the invention not be limited, except as by the appended claim(s).

The teachings disclosed herein may be applied to other apparatuses, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the ergonomic rig for a virtual camera device with which that terminology is associated. In general, the terms used in the following claims should not be construed to limit the ergonomic virtual camera device to the specific embodiments disclosed in the specification unless the above description section explicitly defines such terms. Accordingly, the actual scope encompasses not only the disclosed embodiments, but also all equivalent ways of practicing or implementing the disclosed system, method and apparatus. The above description of embodiments of the ergonomic rig for a virtual camera device is not intended to be exhaustive or limited to the precise form disclosed above or to a particular field of usage.

While specific embodiments of, and examples for the apparatus are described above for illustrative purposes, various equivalent modifications are possible for which those skilled in the relevant art will recognize.

Certain aspects of the apparatus disclosed are presented below in particular claim forms, various aspects of the method, system, and apparatus are contemplated in any number of claim forms. Thus, the inventor reserves the right to add additional claims after filing the application to pursue such additional claim forms for other aspects of the ergonomic rig for a virtual camera device.

What is claimed is:

1. A device for ergonomically manipulating a virtual camera device, comprising:
    a first leg optionally rigidly couplable to a center mount;
    a second leg rotatably couplable to the center mount opposite the first leg, the center mount configured to receive a virtual camera display;
    one or more means for virtual camera tracking disposable along a portion of the second leg; and
    a handle having at least one first handle side, at least one second handle side, at least one top side and at least one bottom side, wherein the at least one first handle side and the at least one second handle side comprise opposite portions of the handle, and wherein the at least one first handle side is rotatably secured to a means for rotatably coupling, wherein the means for rotatably coupling is secured to an outside of the second leg and spaced apart from the joint defined by a rotatable coupling of the second leg and center mount.

2. The device of claim 1, further comprising a grip disposed on a portion of the first leg below a joint defined by the optionally rigid coupling of the first leg and center mount.

3. The device of claim 1, further comprising one or more control panels for operating the virtual camera device, wherein the one or more control panels is communicatively linkable to the virtual camera display and securable to any of the first leg, second leg, display, and center mount.

4. The device of claim 1, further comprising a means for powering the virtual camera device securable to any of the first leg, second leg, virtual camera display, and center mount.

5. The device of claim 1, wherein the second leg is defined by at least one rigid prong projecting from a shoulder portion configured to rotatably couple with the center mount, wherein at least one prong is sized to slidably receive the means for rotatable coupling, wherein the means for rotatable coupling comprises a securable block rotatably coupled to the rotatable handle.

6. The device of claim 5, wherein the at least one prong comprises a first cylinder and a second cylinder, wherein the first cylinder is positioned parallel to the second cylinder.

7. The device of claim 1, wherein the means for rotatable coupling is adjustable along the length of the second leg.

8. The device of claim 1, wherein the means for motion capture tracking comprises at least one of a motion capture wand and a motion capture marker.

9. The device of claim 1, wherein the means for motion capture tracking comprises at least one of one or more light sensors, microphones, RFID tags, and cameras operative to perform through-the-lens match moving.

10. The device of claim 1, wherein the at least one second handle side is formed ergonomically to accommodate the shape defined by a fingers-side portion of a clenched hand.

11. The device of claim 1, further comprising at least one camera disposed on the second leg.

12. The device of claim 1, further comprising at least one camera disposed on the means for rotatably coupling.

13. The device of claim 1, further comprising at least one camera disposed on the handle.

14. A device for ergonomically manipulating a virtual camera device, comprising:
    a first leg rigidly coupled to a center mount;
    a second leg rotatably coupled to the center mount opposite the first leg, the center mount comprising a virtual camera display;

a plurality of motion capture tracking wands and markers extending from a top end of the second leg above a joint defined by the rotatable coupling of the second leg and center mount; and an ergonomic handle having at least one first handle side and at least one second handle side, wherein the at least one first handle side and the at least one second handle side comprise opposite portions of the ergonomic handle, wherein the at least one second handle side is formed ergonomically to conform to the shape defined by a clenched hand, and wherein the at least one first handle side is rotatably and adjustably secured to a means for rotatably coupling, wherein the means for rotatably coupling is adjustably secured to an outside of the second leg and spaced apart from the joint defined by a rotatable coupling of the second leg and center mount.

15. The device of claim 14, wherein the virtual camera display is optionally removable from the center mount.

16. The device of claim 14, wherein the second leg further comprises:
   a) at least one shoulder portion configured to rotatably couple with the center mount;
   b) at least one first cylinder extending from the at least one shoulder portion;
   c) at least one second cylinder extending from the at least one shoulder portion; and
   d) at least one securable block disposed on the at least one first cylinder and the at least one second cylinder, wherein the at least one securable block is configured to provide the rotatable and adjustable securement of the at least one first handle side to the outside of the second leg, and wherein the at least one securable block is configured to lockably slide along the at least one first cylinder and the at least one second cylinder.

17. The device of claim 14, further comprising at least one camera disposed on the handle.

18. A kit, comprising:
   a center mount configured to support a virtual camera display;
   a first leg;
   means for rigidly coupling the first leg to the center mount;
   a second leg;
   means for rotatably coupling the second leg to the center mount in a position spaced apart from the first leg;
   means for motion tracking disposable along a top portion of the second leg;
   a grip disposable along the first leg; and
   a rotatable handle having a long flat side, wherein the rotatable handle long flat side is securable along the second leg.

19. The kit of claim 18, wherein means for developing virtual video recordings comprises a plurality of motion capture tracking wands and markers extending from an upper end of the second leg.

20. The kit of claim 18, wherein the second leg further comprises:
   a) at least one shoulder portion configured to rotatably couple with the center mount;
   b) at least one first cylinder extending from the at least one shoulder portion;
   c) at least one second cylinder extending from the at least one shoulder portion; and
   d) at least one securable block disposed on the at least one first cylinder and the at least one second cylinder, wherein the at least one securable block is configured to rotatably and adjustably secure the rotatable handle long flat side to an outside portion of the second leg, and wherein the at least one securable block is configured to lockably slide along the at least one first cylinder and the at least one second cylinder.

* * * * *